United States Patent [19]

Yamada

[11] Patent Number: 4,644,416
[45] Date of Patent: Feb. 17, 1987

[54] METHOD FOR RECORDING SERVO CONTROL SIGNALS ON A MAGNETIC DISC

[75] Inventor: Yasuhiro Yamada, Tokyo, Japan

[73] Assignee: Victor Company of Japan, Ltd., Japan

[21] Appl. No.: 772,936

[22] Filed: Sep. 5, 1985

[30] Foreign Application Priority Data

Sep. 10, 1984 [JP] Japan .................................. 59-189164

[51] Int. Cl.$^4$ .............................................. G11B 5/86
[52] U.S. Cl. ................................................... 360/17
[58] Field of Search ............................ 360/55, 57, 17

[56] References Cited

U.S. PATENT DOCUMENTS 4,422,106 12/1982 Sawazaki ............................... 360/17

FOREIGN PATENT DOCUMENTS 0037426 10/1981 European Pat. Off. .
742666 12/1955 United Kingdom .
1453169 10/1976 United Kingdom .

OTHER PUBLICATIONS

Funkschau Sonderheft No. 36, Heimvideotechnik 2, 1981, page 24.

Primary Examiner—Vincent P. Canney
Attorney, Agent, or Firm—Lowe, Price, LeBlanc, Becker & Shur

[57] ABSTRACT

A magnetic record medium is subjected to a first magnetic field for uniformly magnetizing the medium in a direction of the thickness thereof. The uniformly magnetized medium is placed in face-to-face contact with a ferromagnetic member on which a plurality of spaced geometrically varying regions are arranged in track turns and subjected to a second magnetic field oriented in a direction opposite to the direction of orientation of the first magnetic field to produce a plurality of spaced oppositely magnetized regions in the record medium.

11 Claims, 13 Drawing Figures

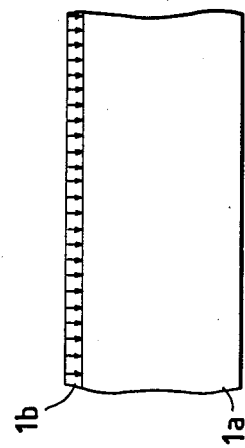
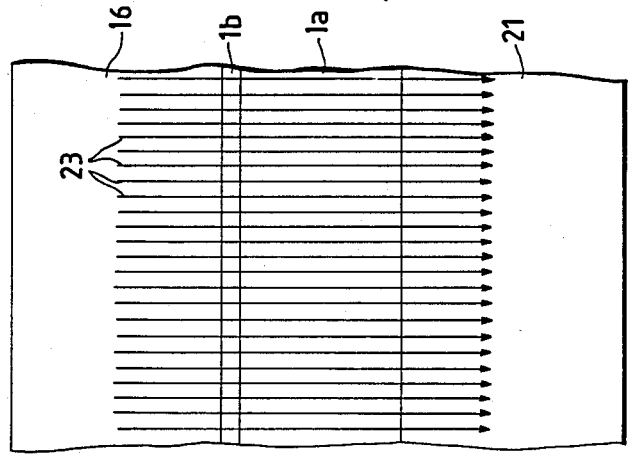
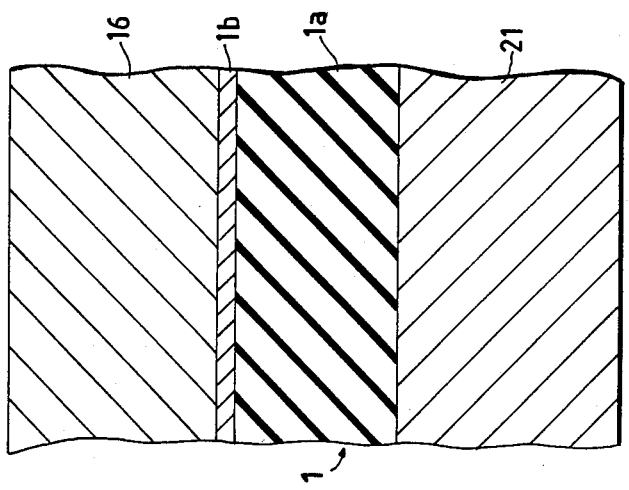

METHOD FOR RECORDING SERVO CONTROL SIGNALS ON A MAGNETIC DISC

BACKGROUND OF THE INVENTION

The present invention relates to a method and apparatus for recording servo control signals on magnetic record mediums for use in buried servo-controlled magnetic recording and playback systems.

In conventional magnetic recording systems operating on a buried servo control principle, a magnetic head is used to record servo control signals for track following purposes during write and readout operations. This is accomplished by moving a recording head along concentric or spiral tracks and recording a servo control signal having a frequency much lower than the frequencies of information signals. The magnetic head used for this purpose has a greater gap length than those used for writing and reading information signals. Because of the difference in gap width, magnetic flux lines produced by the servo control signals extend down to the bottom of the record medium while those produced by the information signals do not, allowing the latter to be recorded on an upper layer of the medium and leaving the servo control signals buried in the lower layer of the medium.

One disadvantage of the conventional method is that the recording hardware construction must be of high precision and stability sufficient to enable the recording magnetic head to move in a radial direction with a close tolerance over the surface of a spinning magnetic disc. Another disdvantage is that it takes a substantial amount of time to record the servo control signals.

SUMMARY OF THE INVENTION

It is therefore an object of the present invention to provide a novel method and apparatus for recording servo control signals on a magnetic record medium such as floppy disc.

The method of the invention comprises the steps of subjecting a magnetic record medium to a first magnetic field for uniformly magnetizing the medium in a direction of the thickness thereof, contacting the uniformly magnetized record medium in a face-to-face relationship with a surface of a ferromagnetic member on which a plurality of spaced geometrically varying regions are arranged in track turns, and subjecting the record medium and the ferromagnetic member to a second magnetic field oriented in a direction opposite to the direction of orientation of the first magnetic field to produce in the record medium a plurality of spaced regions magnetized in a direction opposite to the direction of magnetization by the first magnetic field.

According to another aspect, the present invention provides an apparatus for recording servo control signals on a record medium. The apparatus comprises first magnetizing means for generating a first magnetic field in a direction of the thickness of the record medium and subjecting the record medium in the first magnetic field to uniformly magnetize the medium. Further included is a second magnetizing means comprising a ferromagnetic member having a plurality of spaced geomerically varying regions arranged in track turns on one surface thereof for generating a second magnetic field oriented in a direction opposite to the direction of orientation of the first magnetic field and subjecting the uniformly magnetized record medium and the ferromagnetic member in a face-to-face relationship with each other in the second magnetic field to produce in the record medium a plurality of spaced regions magnetized in a direction opposite to the direction of magnetization by the first magnetic field.

BRIEF DESCRIPTION OF THE DRAWINGS

The present invention will be described in further detail with reference to the accompanying drawings, in which:

FIG. 2A is an enlarged cross-sectional view of a portion of the magnetic disc interposed between ferromagnetic members within the apparatus of FIG. 1, and FIGS. 2B and 2C are views illustrating magnetic fields generated in the magnetic disc of FIG. 1;

DETAILED DESCRIPTION

Figure 1:
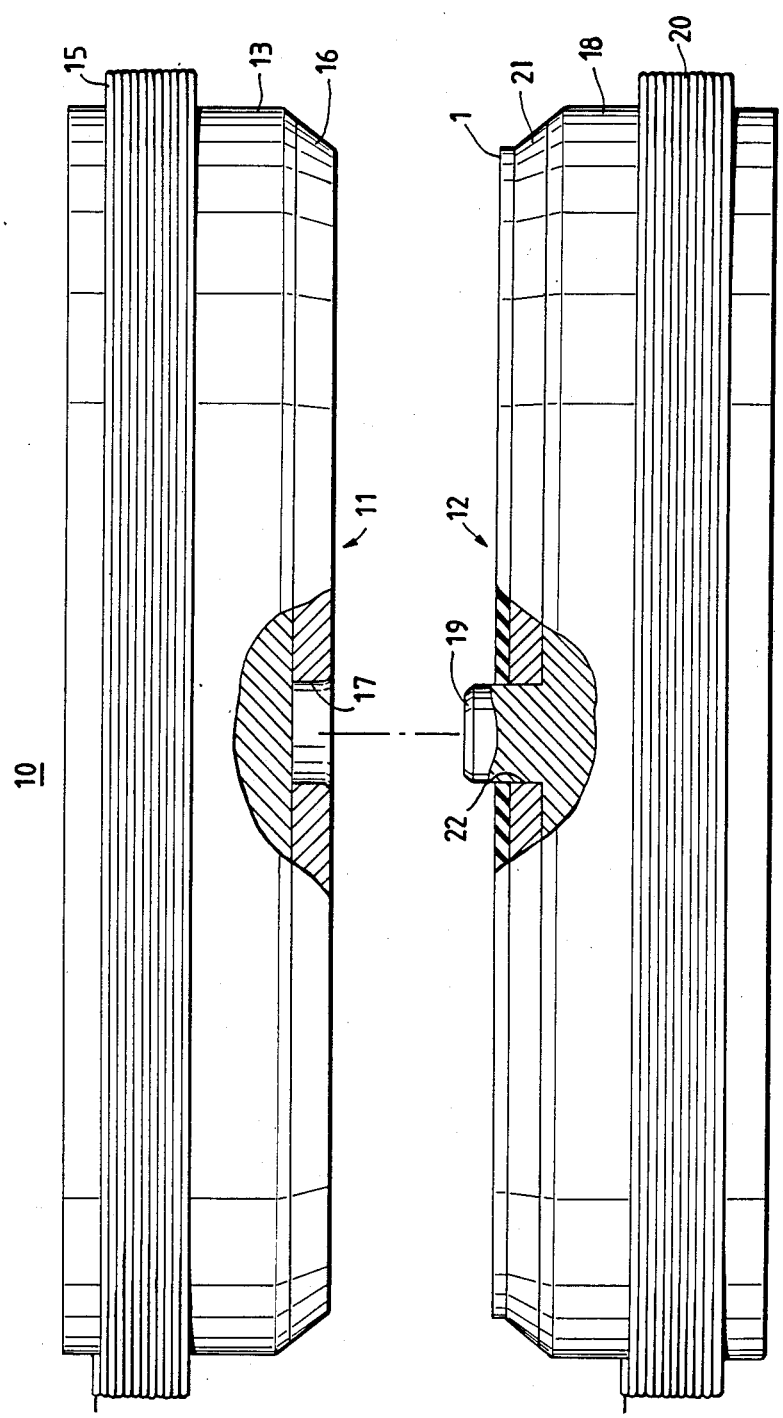
FIG. 1 is a side elevational view of an apparatus of the invention used for uniformly magnetizing a single-sided magnetic floppy disc.

Shown in FIG. 1 is an apparatus 10 used in a first stage of the method of recording servo control signals on a magnetic disc record medium such as floppy discs according to the present invention. Apparatus 10 comprises an upper electromagnet 11 which is fixed to a suitable elevating mechanism, not shown, and a lower electromagnet 12 which is mounted on a base, not shown. Upper electromagnet 11 comprises a cylindrical core 13 and a coil 15 wound on the core. To the underside of the core 13 is fixed a ferromagnetic disc 16 having a center alignment hole 17.

Lower electromagnet 12 comprises a cylindrical core 18 having a spindle 19 and a coil 20 wound on the core 18. A ferromagnetic disc 21 having a center hole 22 mounted on the core 18 with the hole 22 engaging with the spindle 19.

A floppy disc 1 is placed on the ferromagnetic disc 21. Upper magnet 11 is then lowered so that the spindle 19 is received in the hole 17 and the floppy disc 1 is sandwiched between the upper and lower ferromagnetic discs 16 and 21 as illustrated in FIG. 2A. In one example, the floppy disc 1 is of a conventional single-sided type having a single layer 1b of magnetic material on a base 1a. Upper and lower coils 15 and 20 are then energized by DC currents to generate a uniform magnetic field as indicated by downwardly-pointed arrows 23 shown in FIG. 2B. In this way, the magnetic layer 1b remains uniformly magnetized in a vertical direction (FIG. 2C) and withdrawn from the apparatus 10.

Figure 3:
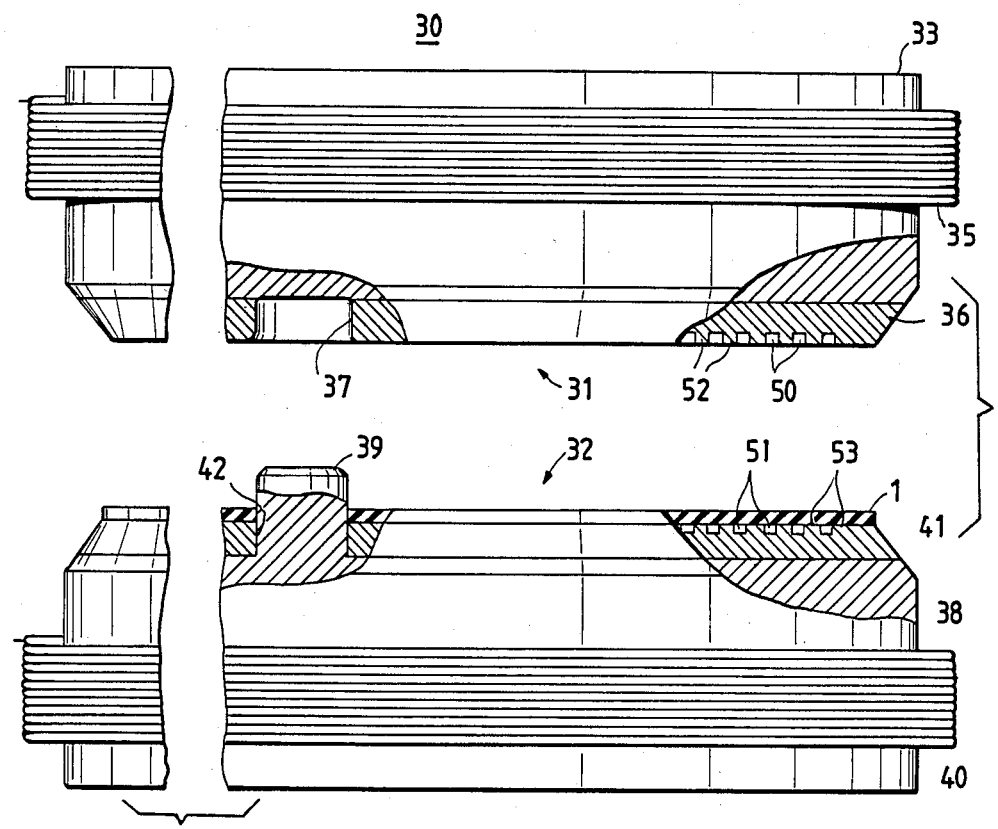
FIG. 3 is a side elevational view of an apparatus of the invention used for locally magnetizing the uniformly magnetized disc in a direction opposite to the direction of magnetization of the apparatus of FIG. 1.

An apparatus 30 shown in FIG. 3 is used in the second stage of the method of the invention. Apparatus 30 comprises an upper electromagnet 31 and a lower electromagnet 32. In a manner similar to apparatus 10, upper magnet 31 is formed by a cylindrical core 33 and a coil 35 wound on the core 33 and is adapted for support on a suitable elevating mechanism, not shown. A ferromagnetic disc 36 having a center hole 37 is fixed to the underside of the core 33.

Lower magnet 32, which is mounted on a base, not shown, is constructed of a core 38 having a spindle 39 and a coil 40 wound thereon. A ferromagnetic disc 41 having a center hole 42 is secured to the core 38 with the hole 42 engaging the spindle 39.

Figure 4:
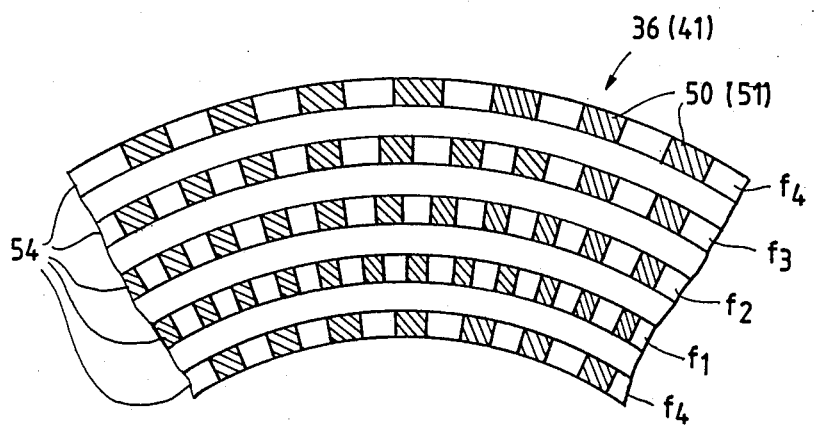
FIG. 4 is an illustration of a pattern of servo control signals recorded on a surface of each ferromagnetic disc of FIG. 2.

Ferromagnetic disc 36 is formed on its underside with a pattern of servo control signals which are in the form of microscopic pits 50 marked by hatched rectangles arranged in concentric tracks 55 as shown in FIG. 4. Pit 50 on adjacent tracks differ in frequency to permit discrimination of tracks. In a typical example, adjacent four tracks have different frequencies $f_1$, $f_2$, $f_3$ and $f_4$ and this pattern of frequencies is recyclically repeated. Likewise, the ferromagnetic disc 41 is formed on its upperside with a pattern of servo control signals in the form of microscopic pits 51 arranged in concentric tracks. It will be noted that the servo control signals may also be recorded in these ferromagnetic discs in the form of microscopic protuberances instead of pits. The servo control signals formed in the ferromagnetic disc 36 can thus be represented by a plurality of spaced microscopic regions of varying geometric configuration.

Figure 5C:
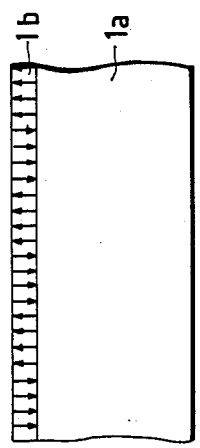
FIG. 5A is an enlarged cross-sectiona view of a portion of the floppy disc interposed between ferromagnetic discs bearing the pattern of FIG. 4, and FIGS. 5B and 5C are views illustrating magnetic fields generated in the disc of FIG. 3.
Figure 5B:
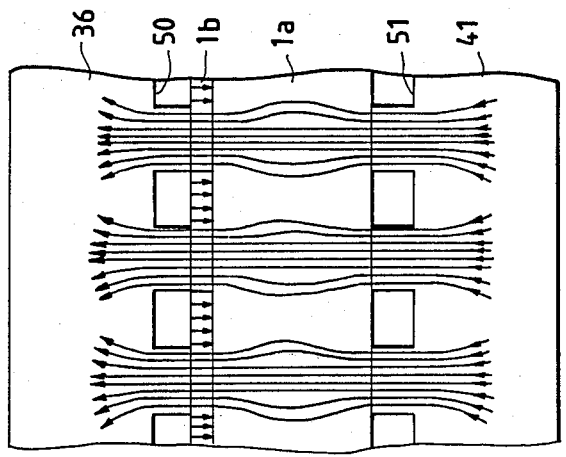
Figure 5A:
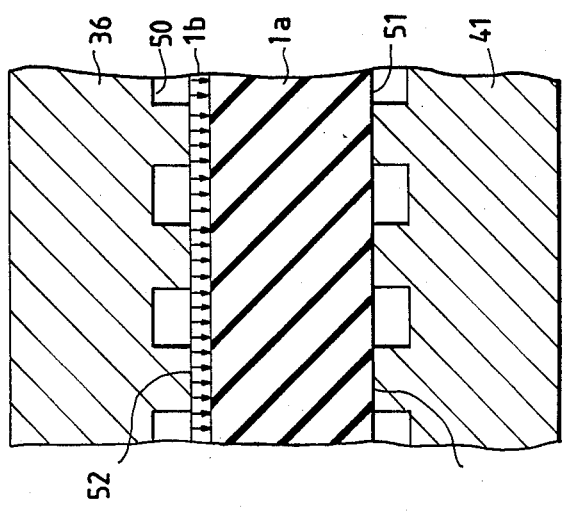

The uniformly magnetized floppy disc 1 is placed on the ferromagnetic disc 41. Upper magnet 31 of apparatus 30 is then lowered so that the spindle 39 is received in the hole 37 and the floppy disc 1 is sandwiched between the upper and lower ferromagnetic discs 36 and 41 as illustrated in FIG. 5A. Although it is preferred that the microscopic pits 50 of upper ferromagnetic disc 36 be precisely aligned with the pits 51 of lower disc 41, a certain degree of radial displacement is allowed.

Upper and lower coils 35 and 40 are then energized to generate a static magnetic field in a direction opposite to the direction of flux generated in the layer $1b$ previously by the apparatus 10. Because of the high reluctance path provided by pits 50 and 51 in discs 36 and 41, the opposite magnetic flux lines concentrate in land portions 52 and 53 unoccupied by the pits and pass exclusively through the portions of the magnetic layer $1b$ which are in contact with the and portions 52, 53 as shown in FIG. 5B. The intensity of the opposite magnetic field concentrated in the land portions is such that it cancels the flux previously generated in layer $1b$ and magnetizes it in the opposite direction. The pit-corresponding portions of layer $1b$ thus retains the previously generated flux. In this way, a magnetic pattern of servo control signals is recorded by the fluxes indicated by downwardly pointed arrows in FIG. 5C. If the servo control signals are recorded in discs 36 and 41 in the form of protuberances instead of pits, magnetic fluxes indicated by the upwardly pointed arrows will represent the servo control signals.

Figure 6:
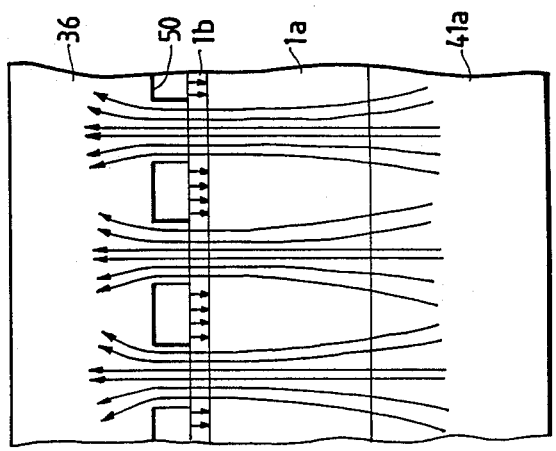
FIG. 6 is an illustration of a modified embodiment.

While it is preferred to use the ferromagnetic disc 41 having a servo control pattern, it is also possible to employ a ferromagnetic disc $41a$ having no servo control pattern. FIG. 6 shows a magnetic flux distribution given by an alternative form of the invention employing the disc $41a$.

It will be seen from the foregoing that servo control signals can be recorded in a magnetic record medium in a considerably high efficient manner with a high degree of precision not attainable with the prior art in which the record medium is scanned by a magnetic head.

Figure 7C:
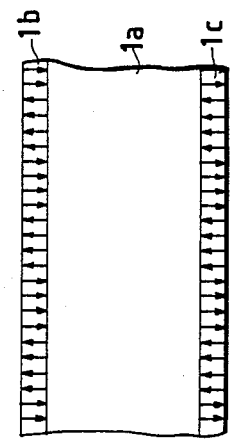
FIGS. 7A, 7B and 7C are illustrations showing a magnetic field distributions within a double-sided floppy disc.
Figure 7B:
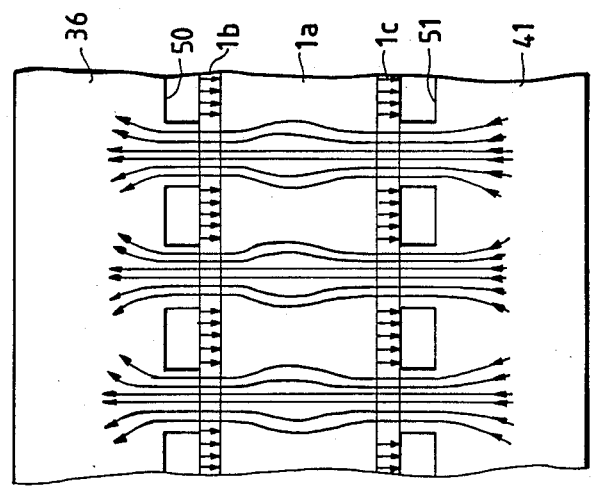
Figure 7A:
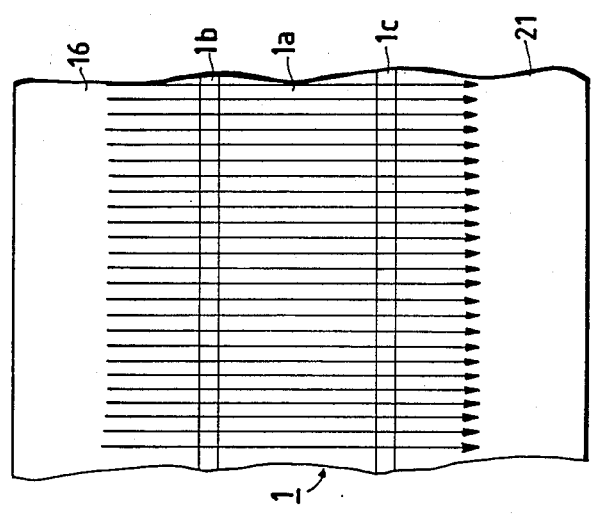

If the apparatus 10 and 30 of the invention are equally useful for recording servo control signals on double-sided floppy discs. FIGS. 7A to 7C are illustrations of steps a double-sided floppy disc undergoes. Floppy disc 1 having magnetic layers $1b$, $1c$ on base $1a$ is uniformly magnetized by the apparatus 10 (FIG. 7A), and then locally magnetized in opposite direction by the apparatus 30 (FIG. 7B), resulting in a magnetic record of servo control signals on each of the magnetic layers $1b$ and $1c$ (FIG. 7C).

Ferromagnetic discs 36 and 41 are formed of a material such as iron, nickel, permalloy or ferrite or any other material which is capable of being erroded by echant. Servo control pattern is produced by etching a ferromagnetic blank through a photoresist which bears a servo control pattern produced by exposure to a laser beam modulated in intensity of servo control signals and by photographic development, in a manner identical to the laser cutting method used in the manufature of digital audio records. Specifically, the microscopic pits have a length of 10 to 30 micrometers on tracks which are spaced a center-to-center distance of about 10 micrometers. Alternatively, servo control pattern data is generated by programming a computer. Using a known photo-plotter, the servo control data is plotted on a sheet to produce a pattern of servo control signals on an enlarged scale (typically ten times larger than the size of the record medium). The servo control pattern thus produced is photographed on a reduced scale to produce an original tracking pattern on a negative, which is applied as a photomask onto a photoresist layer coated on a ferromagnetic blank to permit it to be exposed to flood light through the photomask.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for recording servo control signals on a magnetic disc record medium, comprising the steps of:
   (a) subjecting said record medium to a first magnetic field simultaneously penetrating the entire area of a recording surface of said medium for uniformly magnetizing the medium in a direction of the thickness thereof;
   (b) contacting the uniformly magnetized record medium in a face-to-face relationship with a surface of a ferromagnetic member on which a predetermined pattern of spaced geometrically varying regions is arranged in track turns; and
   (c) generating a second magnetic field simultaneously penetrating said geometrically varying regions in a direction opposite to the direction of said first magnetic field for causing said second magnetic field to be spatially modulated by said regions and subjecting said record medium to said spatially modulated magnetic field to produce in said medium a plurality of spaced regions magnetized in a direction opposite to the direction of magnetization by the first magnetic field.

2. A method as claimed in claim 1, wherein the step (b) further comprises the step of contacting a second, opposite surface of said record medium with a surface of a second ferromagnetic member having thereon a plurality of spaced geometrically varying regions, the spaced regions of said first and second ferromagnetic members being aligned with each other, and wherein the step (c) comprised the further step of subjecting said record medium and said first and second ferromagnetic members to said second magnetic field so that the second magnetic field simultaneously penetrates the geometrically varying regions of said first and second ferromagnetic members producing said spaced regions magnetized in said opposite direction.

3. A method as claimed in claim 2, wherein the spaced regions of said first and second ferromagnetic members are aligned with each other.

4. A method as claimed in claim 3, wherein the spaced regions on each track turn of each of said ferromagnetic members occur at a rate different from the rate of occurrence of those on adjacent track turns.

5. A method as claimed in claims 1, wherein the step (a) comprises the further step of interposing said record medium between two ferromagnetic members and simultaneously magnetizing the record medium through the two ferromagnetic members.

6. An apparatus for recording servo control signals on a magnetic disc record medium comprising:
 first magnetizing means for generating a first magnetic field in a direction of the thickness of the record medium, said first magnetic field simultaneously penetrating the entire area of a recording surface of the record medium to uniformly magnetize the medium; and
 second magnetizing means including a ferromagnetic member having a predetermined pattern of spaced geometrically varying regions arranged in track turns on one surface thereof for generating a second magnetic field in a direction opposite to the direction of said first field and to produce in said record medium a plurality of spaced regions magnetized in a direction opposite to the direction of magnetization by said first magnetic field by bringing said uniformly magnetized record medium and said ferromagnetic member together in a face-to-face relationship with each other in said second magnetic field wherein said second magnetic field simultaneously penetrates said geometrically varying regions and the entire area of said recording surface.

7. An apparatus as claimed in claim 6, wherein said second magnetizing further includes a second ferromagnetic member contacting a surface of said record medium opposite to the surface thereof contacting the first-mentioned ferromagnetic member, the second ferromagnetic member having a plurality of spaced geometrically varying regions identical to those of said ferromagnetic member and means for bringing said first and second ferromagnetic members and said record medium into face-to-face contact relationship with each other in said second magnetic field.

8. An apparatus as claimed in claim 7, wherein said first and second magnetizing means comprise means for aligning said spaced geometrically varying regions of each said ferromagnetic member with those of the other member.

9. An apparatus as claimed in claim 8, wherein the spaced regions on each track turn of each said ferromagnetic member occur at a rate different from the rate of occurrence of those on adjacent track turns.

10. An apparatus as claimed in claim 6, wherein said first magnetizing means comprises a pair of additional ferromagnetic members one on each surface of said record medium and means for subjecting said record medium and said additional ferromagnetic members to said second magnetic field.

11. An apparatus as claimed in claim 6, wherein said second magnetizing means further includes a second ferromagnetic member contacting a surface of said record medium opposite to the surface thereof contacting the first-mentioned ferromagnetic member, the second ferromagnetic member having a plurality of spaced geometrically varying regions aligned with those of said ferromagnetic member and means for bringing said first and second ferromagnetic members and said record medium into face-to-face contact relationship with each other in said second magnetic field.

* * * * *